(12) United States Patent
Sumit et al.

(10) Patent No.: US 11,699,179 B2
(45) Date of Patent: Jul. 11, 2023

(54) SIZE AND FITTING RECOMMENDATION SYSTEMS AND METHOD FOR FASHION PRODUCTS

(71) Applicant: Myntra Designs Private Limited, Bangalore (IN)

(72) Inventors: Borar Sumit, Karnataka (IN); Ghani Mohammed Abdulla, Bangalore (IN); Sengupta Srijit, Karnataka (IN)

(73) Assignee: Myntra Designs Private Limited, Bangalore (IN)

( * ) Notice: Subject to any disclaimer, the term of this patent is extended or adjusted under 35 U.S.C. 154(b) by 222 days.

(21) Appl. No.: 16/266,789

(22) Filed: Feb. 4, 2019

(65) Prior Publication Data

US 2019/0347706 A1 Nov. 14, 2019

(30) Foreign Application Priority Data

May 8, 2018 (IN) .............................. 201841017210

(51) Int. Cl.
*G06Q 30/0601* (2023.01)
(52) U.S. Cl.
CPC ................................ *G06Q 30/0631* (2013.01)
(58) Field of Classification Search
CPC . G06Q 30/0631; G06Q 30/0601–0645; G06N 20/00
(Continued)

(56) References Cited

U.S. PATENT DOCUMENTS 10,290,040 B1 * 5/2019 Misra ..................... H04L 67/22
11,004,133 B1 * 5/2021 Kim .................. G06F 16/24578
(Continued)

OTHER PUBLICATIONS

Here's How Le Tote Uses Data to Deliver Personalized Fashion-Rental Experiences, ETail, Jul. 7, 2017 (Year: 2017).*

*Primary Examiner* — Allison G Wood
*Assistant Examiner* — Anna Mae Mitros
(74) *Attorney, Agent, or Firm* — IceMiller LLP

(57) ABSTRACT

A system for size and fitting recommendation for fashion products is provided. The system includes a memory having computer readable instructions stored therein. The system further includes a processor configured to access purchase and content data of one or more fashion products purchased by a plurality of users. The processor is configured to generate an observable feature vector for each of the one or more fashion products. The observable feature vector is generated based upon observable features data corresponding to each of the one or more fashion product. The processor is further configured to aggregate the observable feature vectors of the fashion products purchased by each user to compute an observable user vector for the respective user. In addition, the processor is further configured to generate a latent feature vector for each of the one or more fashion products. The latent feature vector is generated based upon latent features data corresponding to each fashion product. Furthermore, the processor is configured to aggregate the latent feature vectors of fashion products purchased by each user to compute a latent user vector for the respective user. Moreover, the processor further configured to generate size and fitting recommendations of fashion products for each user based upon the observable feature vector, the observable user vector, latent feature vector and the latent user vector.

16 Claims, 5 Drawing Sheets

(58) Field of Classification Search
USPC .................................... 705/26.7, 26.1–27.2
See application file for complete search history.

(56) References Cited

U.S. PATENT DOCUMENTS

| | | | |
|---|---|---|---|
| 2012/0233127 A1* | 9/2012 | Solmer | G06F 16/113 |
| | | | 707/769 |
| 2014/0067596 A1* | 3/2014 | McGovern | G06Q 30/0246 |
| | | | 705/26.7 |
| 2017/0091844 A1* | 3/2017 | Yarvis | G06Q 30/0631 |
| 2018/0268818 A1* | 9/2018 | Schoenmackers | G10L 15/26 |
| 2019/0130285 A1* | 5/2019 | Snyder | G06N 5/022 |
| 2019/0295114 A1* | 9/2019 | Pavletic | G06N 3/08 |

* cited by examiner

SIZE AND FITTING RECOMMENDATION SYSTEMS AND METHOD FOR FASHION PRODUCTS

PRIORITY STATEMENT

The present application claims priority under 35 U.S.C. § 119 to Indian patent application number 201841017210 filed 8 May 2018, the entire contents of which are hereby incorporated herein by reference.

BACKGROUND

The invention relates generally to a system for size recommendation for fashion products and more particularly to a system and method for recommending fitting and size information for fashion products such as available for sale on an e-commerce platform.

Nowadays, online shopping platforms provide consumers with convenience of shopping at home. Fashion products and especially apparel, is one of the fastest growing category in these e-commerce platforms. In general, such platforms have a variety of fashion products available in different sizes and fitting. Typically, product fit for such fashion products is an important element for consumers in determining their overall satisfaction with the fashion products. If the consumers are not satisfied with either of the size or fit of the fashion product purchased via the e-commerce platform, they may return the products. This may lead to inconvenience for the consumers along with increased shipping, logistics and other operational costs for the merchants.

Moreover, the e-commerce platforms typically do not provide the consumers an option to try and inspect the product for their fit and size unlike offline trial rooms. Consumers' purchase decision rests purely on product details such as images, description and size charts provided with the product on the e-commerce platform. However, using the size charts may require consumers to remember their body measurements and compare them with product dimensions provided in the size charts. Moreover, different types of apparel may have similar size representations, such as small (S), medium (M), large (L), extra-large (XL), across different fashion brands, however they may represent different physical measurements. For consumers, it may be challenging to find the right size for their body shape as the retail industry does not have a standard sizing system. In addition, it may be difficult for the online shoppers to determine a fit of the product for themselves as they do not have the option of trying the fashion products such as apparel before they purchase them.

Currently, some fashion e-commerce websites provide product recommendations for consumer based on data available for consumers past interactions. However, such recommendations are based on consumers' style preferences and do not take into account the size preferences of the consumer. Some of the existing recommendation techniques determine fit and size preferences based on 3D modelling of body shapes of the consumers. Such techniques rely on inferring body shapes from database of manually curated body shape metrics or extracting body shapes from images.

Thus, there is a need to provide a system that can standardize attributes such as size measurements, color and so forth for the fashion products that can be utilized in providing product recommendations to the consumers.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide a system and method for size and fitting recommendation for fashion products.

Briefly, according to an example embodiment, a system for size and fitting recommendation for fashion products is provided. The system includes a memory having computer readable instructions stored therein. The system further includes a processor configured to access purchase and content data of one or more fashion products purchased by a plurality of users. The processor is configured to generate an observable feature vector for each of the one or more fashion products. The observable feature vector is generated based upon observable features data corresponding to each of the one or more fashion product. The processor is further configured to aggregate the observable feature vectors of the fashion products purchased by each user to compute an observable user vector for the respective user. In addition, the processor is further configured to generate a latent feature vector for each of the one or more fashion products. The latent feature vector is generated based upon latent features data corresponding to each fashion product. Furthermore, the processor is configured to aggregate the latent feature vectors of fashion products purchased by each user to compute a latent user vector for the respective user. Moreover, the processor is further configured to generate size and fitting recommendations of fashion products for each user based upon the observable feature vector, the observable user vector, latent feature vector and the latent user vector.

According to another example embodiment, a size and fitting recommendation system for fashion products is provided. The system includes a memory having computer-readable instructions stored therein. The system further includes a processor configured to access purchase and content data of one or more fashion products purchased by a plurality of users. The processor is configured to identify a first set of fashion products associated with a first purchase record and a second set of fashion products associated with a second purchase record. The first purchase record is substantially greater than the second purchase record. The processor is further configured to generate a first observable user vector and a first latent user vector for each of the first set of fashion products. The first observable user vector is generated based upon observable features data corresponding to each of the first set of fashion products and the first latent user vector is generated based upon latent features data corresponding to each of the first set of fashion products. Further, the processor configured to generate a second observable user vector and a second latent user vector for each of the second set of fashion products. The second observable user vector is generated based upon observable features data corresponding to each of the second set of fashion products and the second latent user vector is generated based upon latent features data corresponding to each of the second set of fashion products. Furthermore, the processor is configured to generate size and fitting recommendations of the first set of fashion products for each user via a first deep learning model based upon the first observable user vector and the first latent user vector. Moreover, the processor further configured to generate size and fitting recommendations of the second set of fashion products for each user via a second deep learning model based upon the second observable user vector and the second latent user vector. The second deep learning model receives deep learning data corresponding to the first set of fashion products from the first deep learning model.

According to another example embodiment, a method for recommending size and fitting information for fashion products is provided. The method includes accessing purchase and content data of one or more fashion products purchased by a plurality of users and identifying a first set of fashion products and a second set of fashion products. The first set of fashion products are relatively frequently purchased by the users compared to the second set of fashion products. In addition, the method includes generating a first observable user vector and a first latent user vector for the first set of fashion products. The first observable user vector is generated based upon observable features data corresponding to each of the first set of fashion products and the first latent user vector is generated based upon latent features data corresponding to each of the first set of fashion products. The method further includes generating a second observable user vector and a second latent user vector for the second set of fashion products. The second observable user vector is generated based upon observable features data corresponding to each of the second set of fashion products and the second latent user vector is generated based upon latent features data corresponding to each of the second set of fashion products. The method also includes generating size and fitting recommendations of the first set of fashion products for each user via a first deep learning model based upon the first observable user vector and the first latent user vector. The method further includes transmitting deep learning data corresponding to the first set of fashion products to a second deep learning model and generating size and fitting recommendations of the second set of fashion products for each user via the second deep learning model based upon the second observable user vector and the second latent user vector.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
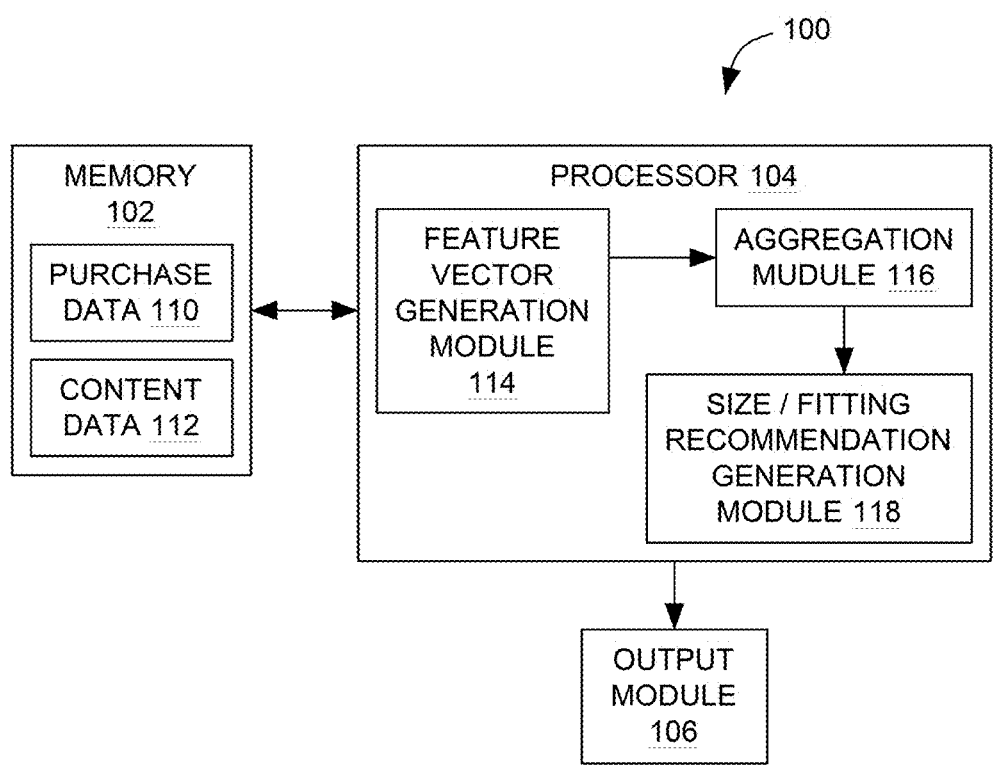
FIG. 1 illustrates a block diagram illustrating a size and fitting recommendation system for fashion products, according to an example embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

At least one example embodiment is generally directed to a system for providing size and fitting recommendations for fashion products such as available for sale on an e-commerce platform.

FIG. 1 is a block diagram illustrating a size and fitting recommendation system 100 for fashion products. The system 100 includes a memory 102, a processor 104 and an output module 106. Each component is described in further detail below.

The processor 104 includes a feature vector generation module 114, an aggregation module 116 and a size and fitting recommendation generation module 118. The processor 104 is communicatively coupled to the memory 102 and is configured to access purchase data 110 and content data 112 of one or more fashion products purchased by a plurality of users via an e-commerce fashion platform. The fashion product may include a top wear, a bottom wear, footwear, a bag or combinations thereof. The purchase data 110 may include the details such as type of fashion products purchased by the users, cost of the fashion products, type of the season in which the fashion products were purchased by the users and so forth. In addition, the content data 112 may include the details such as attributes of the fashion products purchased by the user, sizing and fitting information of the fashion products, type of the fashion products, a brand associated with the fashion products and the like.

In operation, the feature vector generation module 114 is configured to generate an observable feature vector for each of the one or more fashion products. In an embodiment, the observable feature vector is generated based upon observable features data corresponding to each of the one or more fashion products. As used herein, the term "observable features" refers to features of the fashion products that can be determined from a catalogue of the fashion products. Examples of the observable features data include physical measurements (e.g., a width of a shoe), type of material, a season type, an occasion type, colour, a shape of the product (e.g., shape of a dress), a type of the product (e.g., a type of a shoe), or combinations thereof of each of the fashion products. In one example, the physical measurements data of the fashion products are continuous values and may be used directly, whereas other categorical product attributes may be used as one hot encoded value.

The feature vector generation module 114 is further configured to generate a latent feature vector for each of the one or more fashion products. In an embodiment, the latent feature vector may be generated based upon latent features data corresponding to each fashion product. Examples of the latent features data include design information, brand information, a type of fit, or combinations thereof of each of the fashion products. In some examples, the feature vector generation module 114 is configured to generate the latent feature vector for each of the one or more fashion products using a skip gram technique. Examples of other techniques that may be used to generate the latent feature vector include bag words model, GLOVE model, low rank matrix factorization, and the like. In some embodiments, the skip gram word2vec model may be trained based upon the user's non returned purchase data and product content data from each of the product category.

The aggregation module 116 is configured to aggregate the observable feature vectors of the fashion products purchased by each user to compute an observable user vector for the respective user. In addition, the aggregation module 116 is further configured to aggregate the latent feature vectors of fashion products purchased by each user to compute a latent user vector for the respective user. In some embodiments, the aggregation module 116 employs an aggregate function to compute the observable feature vectors and a gradient boosted classifier to output fit probability of the fashion products.

The size and fitting recommendation generation module 118 is configured to generate size and fitting recommendations of fashion products for each user based upon the observable feature vector, the observable user vector, latent feature vector and the latent user vector. In one embodiment, the size and fitting recommendation generation module 118 generates the size and fitting recommendations using a Gradient Boost Classifier (GBC). In other examples, other suitable techniques such as a nonlinear classifier like a neural network, ensemble methods like boosting and bagging may be used to generate size and fitting recommendations. In this example, the size and fitting recommendations include personalized size information across brands, product type, fit type, brand type or combinations thereof of the fashion products for each user.

In one example, the size recommendations are formulated as a binary classification in which the task is to classify if a given size and/or fit of a fashion product will fit a user. In this example, gradient boosted classifier is used to predict fit probabilities for all the different size/fits of the given fashion product and a user and the one with highest fit probability is identified as the recommendation for the user.

In an example, the processor 104 is further configured to analyse the purchase data 110 of the one or more fashion products purchased by each of the plurality of users to determine reasons for return and/or exchange of fashion products. Further, the processor 104 is configured to identify one or more positive samples of fashion products that are retained by the users and one or more negative samples of fashion products that are returned and/or exchanged by the users. In this example, the purchase data 110, the one or more positive samples, the one or more negative samples, the reasons for return and/or exchange of the fashion products, or combinations thereof, are used by the size and fitting recommendation generation module 118 to train the Gradient Boost Classifier to generate size and fitting recommendations for each of the plurality of users. The output module 108 is configured to display the size and fitting recommendations of the fashion products, generated by the size and fitting recommendation generation module 118, to a user of the system 100.

Figure 2:
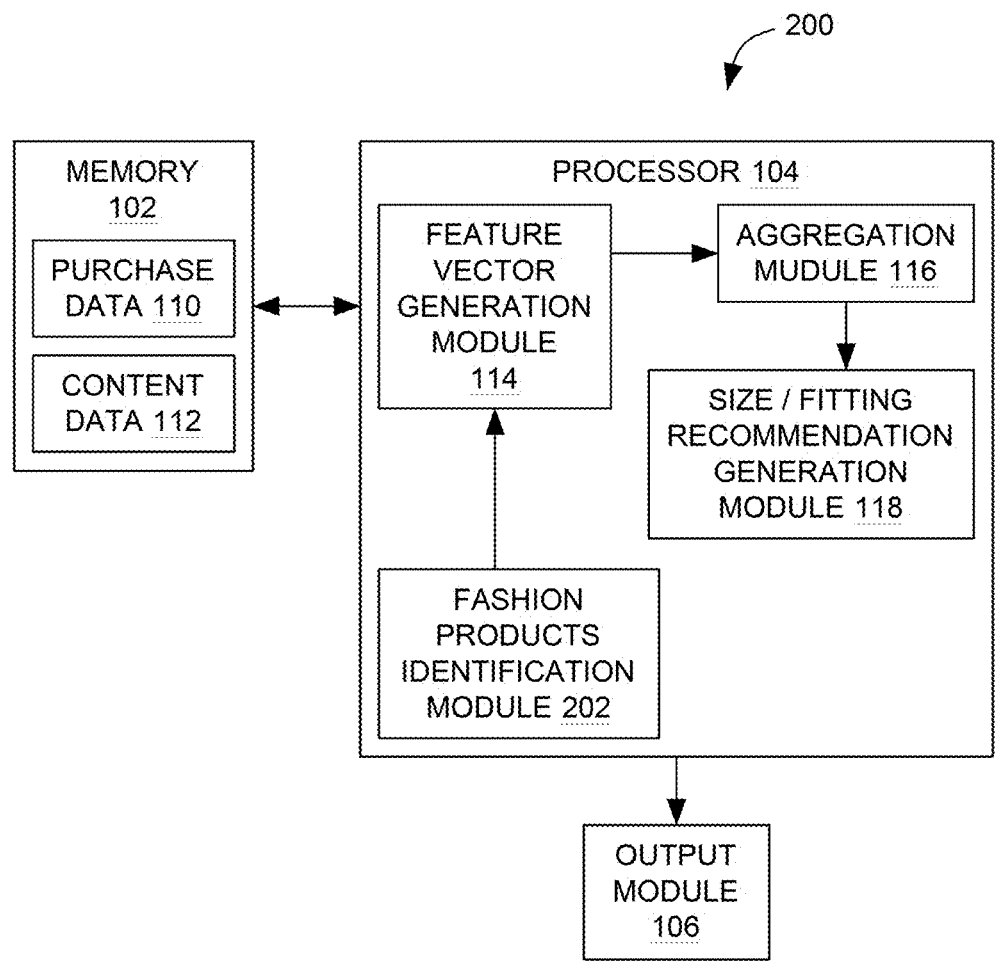
FIG. 2 is a block diagram illustrating another embodiment of the system of FIG. 1.

FIG. 2 is a block diagram illustrating another embodiment 200 of the system 100 of FIG. 1. As with the embodiment of FIG. 1; the system 200 includes the memory 102, the processor 104 and the output module 106. The processor 104 includes the feature vector generation module 114, the aggregation module 116 and the size and fitting recommendation generation module 118. In addition, the processor 104 includes a fashion products identification module 202. In this embodiment, the fashion products identification module 202 is configured to identify a first set of fashion products associated with a first purchase record and a second set of fashion products associated with a second purchase record. In an example, the first set of fashion products are relatively frequently purchased by the users as compared to the second set of fashion products. As a result, the first purchase record is substantially greater than the second purchase record.

In one example, the first set of fashion products may include shirts, t-shirts, jeans, trousers, or combinations thereof. Moreover, the second set of fashion products may include sweaters, jackets, sweatshirts, tunics, or combinations thereof. As will be appreciated by one person skilled in the art, in certain markets, the fashion products such as shirts, t-shirts etc. may be purchased more as compared to the fashion products such as sweaters, jackets, sweatshirts and so forth. However, the first and the second sets of fashion products may vary depending on a number of parameters such as demographics of the consumers, weather of the place, types of the fashion products and so forth. In operation, the feature vector generation module 114 and the aggregation module 116 are configured to generate a first observable user vector and a first latent user vector for each of the first set of fashion products. The first observable user vector is generated based upon observable features data corresponding to each of the first set of fashion products. In addition, the first latent user vector is generated based upon latent features data corresponding to each of the first set of fashion products.

In this example, the observable features data may include physical measurements, type of material, a season type, an occasion type, colour, product type or combinations thereof of each of the fashion products. Moreover, the latent feature data may include design information, brand information, a type of fit, or combinations thereof of each of the fashion products.

In addition, the feature vector generation module 114 and the aggregation module 116 are further configured to generate a second observable user vector and a second latent user vector for each of the second set of fashion products. The second observable user vector is generated based upon observable features data corresponding to each of the second set of fashion products. Further, the second latent user vector is generated based upon latent features data corresponding to each of the second set of fashion products.

In an embodiment, the feature vector generation module 114 is configured to generate first and second observable feature vectors corresponding to the first set of fashion products and second set of fashion products respectively. The aggregation module 116 is further configured to aggregate the first and second observable feature vectors of the fashion products purchased by each user to compute the first and second observable user vectors respectively for each user.

The feature vector generation module 114 is further configured to generate first and second latent feature vectors corresponding to the first set of fashion products and second set of fashion products respectively. In addition, the aggregation module 116 is configured to aggregate the first and second latent feature vectors of fashion products purchased by each user to compute the first and second latent user vectors respectively for each user. In some examples, the feature vector generation module 114 is configured to generate the first latent feature vector for first set of fashion products using a skip gram technique. In this example, the feature vector generation module 114 is further configured to generate the second latent feature vector for second set of fashion products using an autoencoder.

The size and fitting recommendation module 118 is configured to generate size and fitting recommendations of the first set of fashion products for each user via a first deep learning model based upon the first observable user vector and the first latent user vector. The module 118 is further configured to generate size and fitting recommendations of the second set of fashion products via a second deep learning model based upon the second observable user vector and the second latent user vector. In this embodiment, the second deep learning model receives deep learning data corresponding to the first set of fashion products from the first deep learning model.

In this example, the deep learning data corresponding to at least one fashion product of the first set of fashion products is utilized by the second deep learning model for generating the size and fitting recommendations when the at least one fashion product is substantially similar to the second set of fashion product. For example, learning data for sale of a t-shirt may be utilized for generating size and fitting recommendations for a similar product like a jacket. In this example, the size and fitting recommendations include personalized size information across brands, product type, fit type, brand type or combinations thereof of the fashion products for each user.

Figure 3:
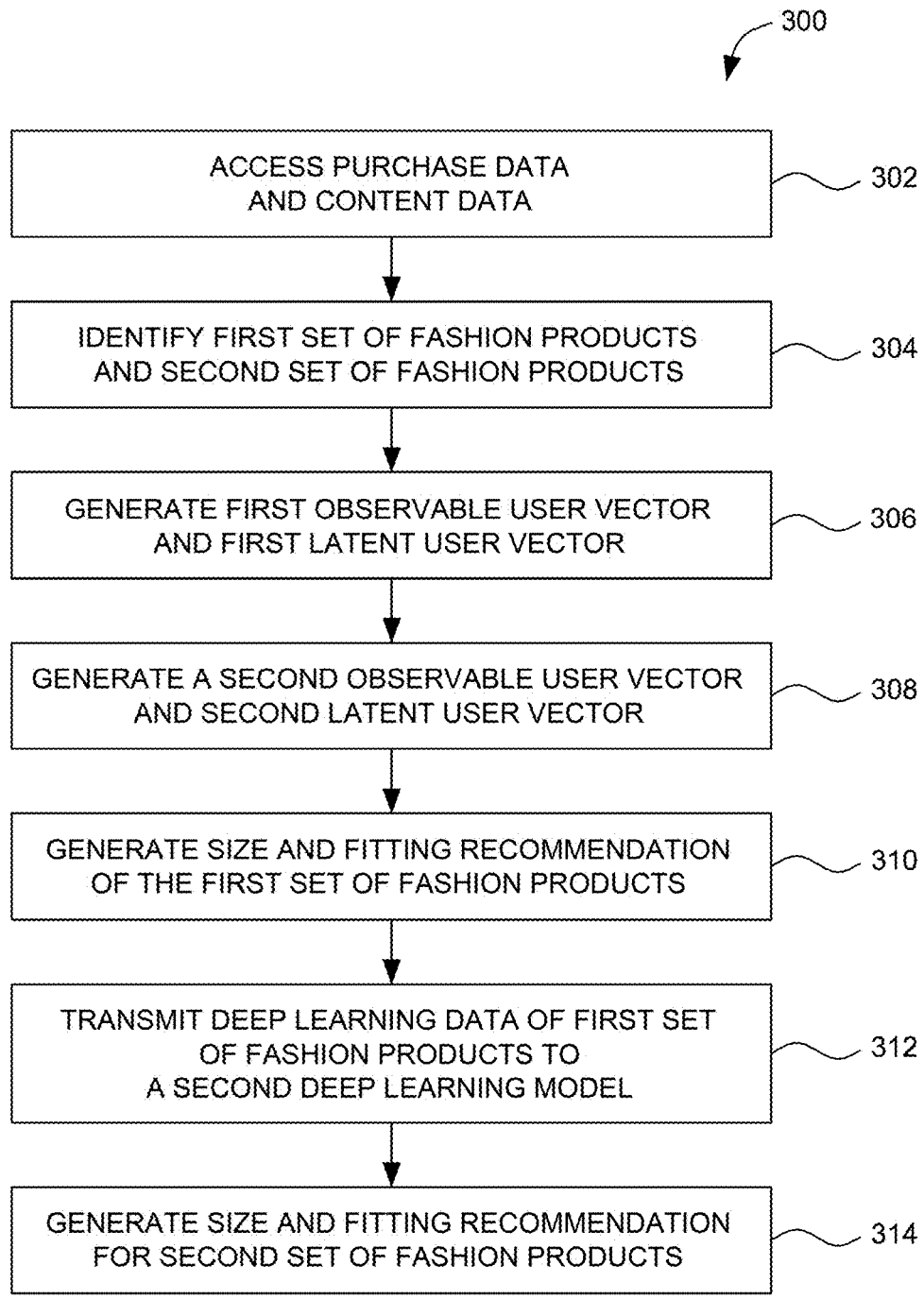
FIG. 3 is an example process for recommending size and fitting for fashion products, using the system of FIG. 1, according to the aspects of the present technique.

FIG. 3 is an example process 300 for recommending size and fitting for fashion products, using the system 100 of FIG. 1, according to the aspects of the present technique.

At step 302, purchase data and content data of one or more fashion products purchased by a plurality of users via an e-commerce fashion platform is accessed. The fashion product may include a top wear, a bottom wear, footwear, a bag or combinations thereof. The purchase data may include the details such as type of fashion products purchased by the users, cost of the fashion products, type of the season in which the fashion products were purchased by the users and so forth. In addition, the content data may include the details such as attributes of the fashion products purchased by the user, sizing and fitting information of the fashion products, type of the fashion products, a brand associated with the fashion products and the like.

At step 304, a first set of fashion products and a second set of fashion products are identified. Here, the first set of fashion products are products that are relatively frequently purchased by the users as compared to the second set of fashion products. In an example, the first set of fashion products may include shirts, t-shirts, jeans, trousers, or the like and the second set of fashion products may include sweaters, jackets, sweatshirts, tunics, or combinations thereof.

At step 306, a first observable user vector and a first latent user vector for the first set of fashion products are generated. The first observable user vector is generated based upon observable features data corresponding to each of the first set of fashion products. Further, the first latent user vector is generated based upon latent features data corresponding to each of the first set of fashion products.

At step 308, a second observable user vector and a second latent user vector for the second set of fashion products, are generated. The second observable user vector is generated based upon observable features data corresponding to each of the second set of fashion products. Further, the second latent user vector is generated based upon latent features data corresponding to each of the second set of fashion products.

At step 310, size and fitting recommendations of the first set of fashion products are generated for each user. In this embodiment, the size and fitting recommendations of the first set of fashion products are generated via a first deep learning model based upon the first observable user vector and the first latent user vector.

At step 312, the deep learning data corresponding to the first set of fashion products is transmitted to a second deep learning model. In one embodiment, in the first set of fashion products, at least one fashion product is substantially similar to the second set of fashion products.

At step 314, a size and fitting recommendations of the second set of fashion products is generated, for each user via the second deep learning model based upon the second observable user vector and the second latent user vector. Further, the size and fitting recommendations may include personalized size information across brands, fit type, product type, brand type, or combinations thereof of the fashion product for each user. The details of generating the size and fitting recommendations of the second set of fashion products using the learnings from the first set of fashion products is described with reference to FIG. 4.

Figure 4:
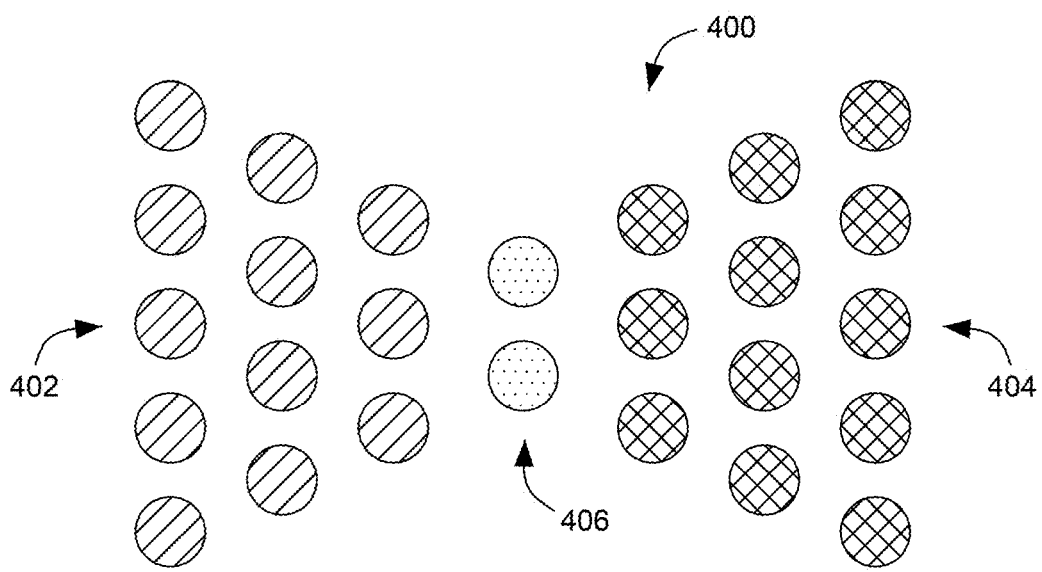
FIG. 4 illustrates an example deep autoencoder model used for generating the size and fitting recommendations for fashion products using the system 100 of FIG. 1.

FIG. 4 illustrates an example deep autoencoder model 400 used for generating the size and fitting recommendations for fashion products using the system 100 of FIG. 1. In this illustrated embodiment, the deep autoencoder model 400 is configured to learn dense representation for a plurality of fashion products based on co-occurrence data in purchase history of a plurality of users.

In the illustrated embodiment, the model 400 uses fashion products information as vectors for generating the size and fitting recommendations. In some examples, attributes in the vectors may be categorical (nominal i.e. take values like regular fit, slim fit and are not numerical).

As described before, the primary source of data for generating the size and fitting recommendations are the user purchase history. Here, word2vec dense vectors are generated for fashion products that have been frequently purchased. These fashion products include shirts, T-shirts, jeans, trousers, kurtas etc. These vectors are used to generate the recommendations for the less purchased fashion products such as jackets, sweaters and so forth.

It should be noted that the autoencoder model 400 is a deep neural network that is given same feature vector as input 402 and output 404. Here, the input feature vector 402 is compressed into a new feature vector 406 with fewer dimensions while training the autoencoder model 400 and later decompressed to get the original feature vector. In this example, the autoencoder 400 utilizes data related to frequently purchased fashion products such as t-shirts, shirts and so on to generate recommendations for relatively less frequently purchased fashion products such as jackets, sweaters and so forth. The input features provided to the autoencoder model 400, have a notion of similarity and hence the compressed features 406 also have the same notion of similarity where products with similar sizes occur together. These compressed autoencoder features are used for the lesser purchased fashion products such as sweaters, jackets and the like.

Table 1 shows precision scores for recommendations generated for various fashion products using the technique described above.

TABLE 1

| Article | Precision | Recall |
| --- | --- | --- |
| Men Shirts | 94.35 | 100 |
| Men T-shirts | 92.60 | 100 |
| Men Jeans | 89.84 | 100 |
| Men Trousers | 89.88 | 100 |
| Men Sweatshirts | 82.77 | 100 |
| Women Kurtas | 89.96 | 100 |
| Women Sweatshirts | 79.09 | 100 |

As can be seen, the technique described above is substantially accurate for generating the size and recommendations using the autoencoder.

Figure 5:
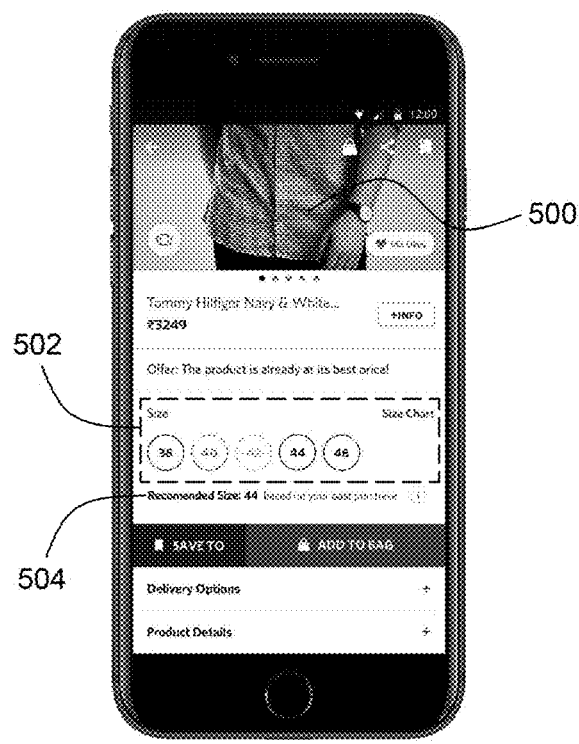
FIG. 5 is an example illustration of a size recommendation for a fashion product displayed to a user via an application on a mobile device.

FIG. 5 is an example illustration of a size recommendation for a fashion product displayed to a user via an application on a mobile device 500. As can be seen, the user is presented with a size chart 502 displaying various sizes such as 38, 44 and 46, available for the fashion product 500. As can be seen, a size recommendation 504 of 44, is recommended for the fashion product 500 for the user. This size recommendation is generated based on users' purchase history. In an embodiment the user may save the fashion product 500 along with the recommended size 44, in his/her wishlist. The user may also, add the selected fashion product 500 with the recommended size 44, to his/her cart in order to purchase the fashion product 500.

Figure 6:
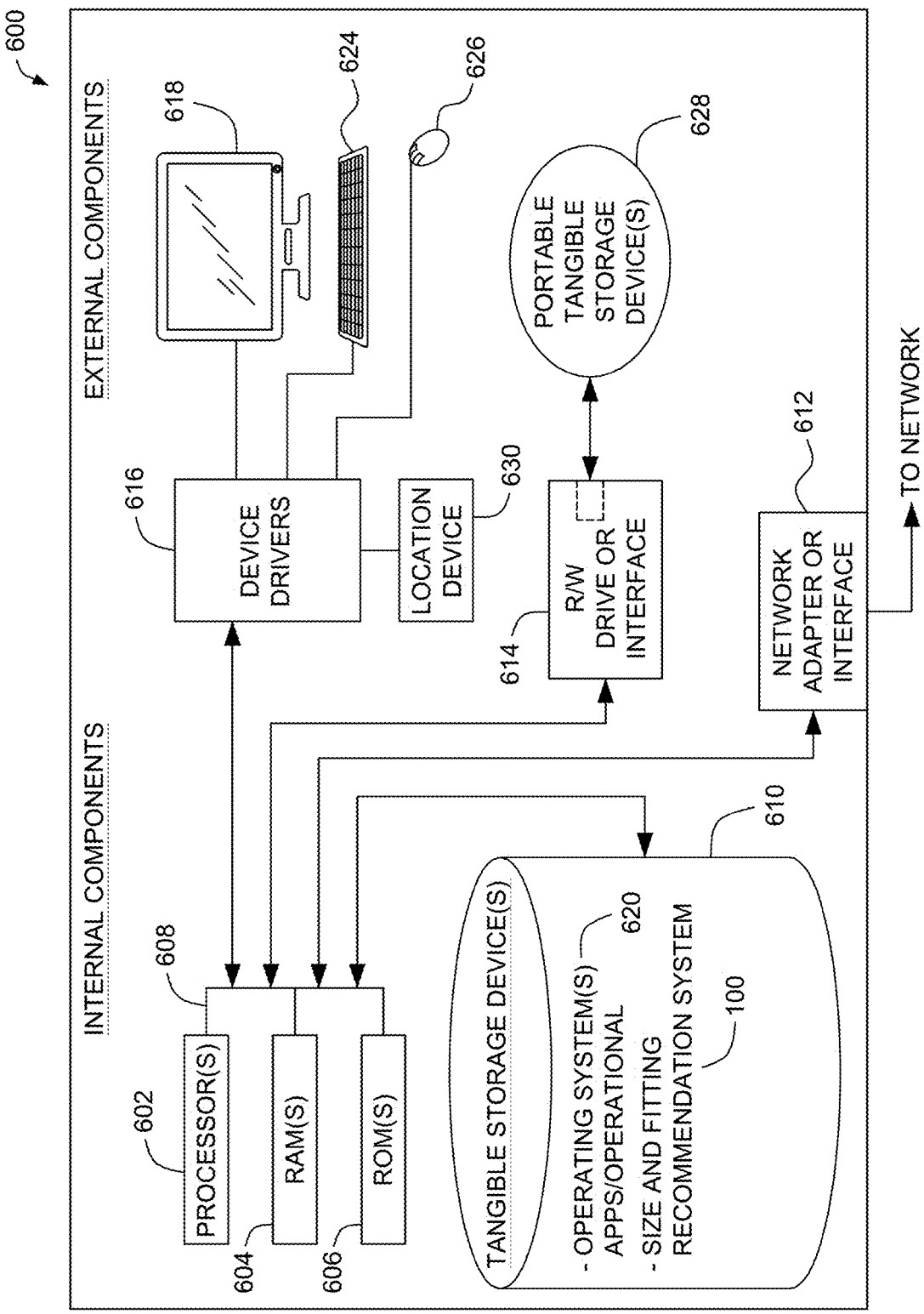
FIG. 6 is a block diagram of an embodiment of a computing device in which the modules of the size and fitting recommendation system, described herein, are implemented.

The modules of size and fitting recommendation system 100 for fashion products described herein are implemented in computing devices. One example of a computing device 600 is described below in FIG. 6. The computing device includes one or more processor 602, one or more computer-readable RAMs 604 and one or more computer-readable ROMs 606 on one or more buses 608. Further, computing device 600 includes a tangible storage device 610 that may be used to execute operating systems 620 and the size and fitting recommendation system 100. The various modules of the size and fitting recommendation system 100 include a processor 104, a memory 102 and an output module 106. The processor 104 further includes a feature vector generation module 114, an aggregation module 116 and a size and fitting recommendation generation module 118. Both, the operating system 620 and the system 100 are executed by processor 602 via one or more respective RAMs 604 (which typically includes cache memory). The execution of the operating system 620 and/or the system 100 by the processor 602, configures the processor 602 as a special purpose processor configured to carry out the functionalities of the operation system 620 and/or the size and fitting recommendation system 100, as described above.

Examples of storage devices 610 include semiconductor storage devices such as ROM 606, EPROM, flash memory or any other computer-readable tangible storage device that may store a computer program and digital information.

Computing device also includes a R/W drive or interface 614 to read from and write to one or more portable computer-readable tangible storage devices 628 such as a CD-ROM, DVD, memory stick or semiconductor storage device. Further, network adapters or interfaces 612 such as a TCP/IP adapter cards, wireless Wi-Fi interface cards, or 3G or 4G wireless interface cards or other wired or wireless communication links are also included in computing device.

In one example embodiment, the size and fitting recommendation system 100 which includes a processor 104, a memory 102 and an output module 106, may be stored in tangible storage device 610 and may be downloaded from an external computer via a network (for example, the Internet, a local area network or other, wide area network) and network adapter or interface 612.

Computing device further includes device drivers 616 to interface with input and output devices. The input and output devices may include a computer display monitor 618, a keyboard 624, a keypad, a touch screen, a computer mouse 626, and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The invention claimed is:

1. A size and fitting recommendation system for fashion products, the system comprising:
   memory having computer-readable instructions stored therein; and
   a processor configured to:
   access purchase and content data of a plurality of first fashion products purchased by at least one user;
   identify one or more second fashion products (i) having a second type with greater similarity to a first type of one or more of the first fashion products than with a third type of a third set of fashion products (ii) purchased less frequently than any of the first fashion products by a set of users, wherein the first and one or more second fashion products are previously purchased, and the greater similarity being based on a criterion being satisfied;
   generate an observable feature vector for each of the first fashion products and another observable feature vector for each of the one or more second fashion products, wherein the observable feature vectors are generated based upon respective observable features data of the fashion products;
   aggregate the observable feature vectors to compute an observable user vector;
   generate a latent feature vector for each of the first fashion products and another latent feature vector for each of the one or more second fashion products, wherein the latent feature vectors are generated based upon respective latent features data of the fashion products;
   aggregate the latent feature vectors to compute a latent user vector;
   train an autoencoder model configured to (i) learn an initial compression, by densely representing the observable user vector and the latent user vector, (ii) learn a subsequent decompression, and (iii) generate at least one size and fitting recommendation for the one or more second fashion products, wherein the compression causes a reduction, during the training, of a number of dimensions of each of the observable user vector and the latent user vector; and
   display, to the at least one user at a user interface, the at least one generated recommendation, comprising personalized size information across brands, fit type, brand type, product type, or combinations thereof of the one or more second fashion products.

2. The size and fitting recommendation system of claim 1, wherein the processor is further configured to execute the computer-readable instructions to access the purchase and content data via an e-commerce fashion platform.

3. The size and fitting recommendation system of claim 2, wherein the previous purchases are performed by users via an e-commerce fashion platform.

4. The size and fitting recommendation system of claim 1, wherein the processor is further configured to execute the computer-readable instructions to further generate the at least one size and fitting recommendation using a Gradient Boost Classifier (GBC), ensemble techniques, or a combination thereof.

5. The size and fitting recommendation system of claim 4, wherein the processor is further configured to execute the computer-readable instructions to: analyze the purchase data to determine reasons for return or exchange of fashion products;
  identify one or more positive samples of fashion products that are retained by at least one of the at least one user or at least one of the set of users;
  identify one or more negative samples of fashion products that are returned or exchanged by at least one of the at least one user or at least one of the set of users;
  train the Gradient Boost Classifier based upon the purchase data, the one or more positive samples, the one or more negative samples, the reasons for the return or exchange, or combinations thereof, and
  utilize the Gradient Boost Classifier to generate size and fitting recommendations.

6. The size and fitting recommendation system of claim 1, wherein the processor is further configured to execute the computer-readable instructions to access the observable features data, and
  wherein the observable features data comprises physical measurements, type of material, a season type, an occasion type, colour, shape, or combinations thereof of each of the fashion product.

7. The size and fitting recommendation system of claim 6, wherein the processor is further configured to execute the computer-readable instructions to generate at least one of the latent feature vectors using a skip gram based technique, a continuous bag of words model, a GLOVE model, low rank matrix factorization, or combinations thereof.

8. The size and fitting recommendation system of claim 1, wherein the processor is further configured to execute the computer-readable instructions to access the latent features data, and
  wherein the latent features data comprises design information, brand information, a type of fit, or combinations thereof of each of the fashion product.

9. A size and fitting recommendation system for fashion products, the system comprising:
  a memory having computer-readable instructions stored therein; and
  a processor configured to:
    access purchase and content data of a plurality of first fashion products purchased by at least one user;
    identify a first set of fashion products associated with a first purchase record and a second set of fashion products associated with a second purchase record, wherein the first purchase record is greater than the second purchase record, wherein at least one second fashion product of the second set of fashion products (i) has a second type with greater similarity to a first type of at least one first fashion product of the first set of fashion products than with a third type of a third set of fashion products (ii) is purchased less frequently than any of the first fashion products by a set of users, the at least one first fashion product being purchased more frequently than the at least one second fashion product, wherein the first and second sets of fashion products are previously purchased, and the greater similarity being based on a criterion being satisfied;
    generate an observable user vector and a latent user vector for the first and second sets of fashion products, wherein each of the observable user vector(s) is generated based upon respective observable features data, and wherein each of the latent user vector(s) is generated based upon respective latent features data;
    train an autoencoder model configured to (i) learn an initial compression, by densely representing the observable user vector and the latent user vector, (ii) learn a subsequent decompression, and (iii) generate at least one size and fitting recommendation for the at least one fashion product of the second set of fashion products, wherein the compression causes a reduction, during the training, of a number of dimensions of each of the observable user vector and the latent user vector; and
    display, to the at least one user at a user interface, the at least one generated recommendation, comprising personalized size information across brands, fit type, brand type, product type, or combinations thereof of the at least one second fashion product of the second set of fashion products.

10. The size and fitting recommendation system of claim 9, wherein the processor is further configured to execute the computer-readable instructions to:
  generate a first observable feature vector and a second observable feature vector corresponding to each of the first and second set of fashion products respectively;
  aggregate the first and second observable feature vectors of fashion products purchased by each user to compute the observable user vector;
  generate a first latent feature vector and a second latent feature vector corresponding to each of the first and second set of fashion products respectively; and
  aggregate the first and second latent feature vectors to compute the latent user vector.

11. The size and fitting recommendation system of claim 10, wherein the processor is further configured to execute the computer-readable instructions to generate the first latent feature vector using a skip gram based technique.

12. The size and fitting recommendation system of claim 10, wherein the processor is further configured to execute the computer-readable instructions to generate the second latent feature vector using an autoencoder.

13. The size and fitting recommendation system of claim 9, wherein the processor is further configured to execute the computer-readable instructions to identify the first and the second set of fashion products, wherein the first and second set of fashion products comprise fashion apparel.

14. The size and fitting recommendation system of claim 13, wherein the processor is further configured to execute the computer-readable instructions to identify the first and the second set of fashion products, wherein the first set of fashion products comprise shirts, t-shirts, jeans, trousers, or combinations thereof and the second set of fashion products comprise sweaters, jackets, sweatshirts, tunics, or combinations thereof.

15. The size and fitting recommendation system of claim 9, wherein the processor is further configured to execute the computer-readable instructions to:

access the observable features data corresponding to each of the one or more fashion products, wherein the observable features data comprises physical measurements, type of material, a season type, an occasion type, colour, product type, or combinations thereof of each of the fashion products; and access the latent features data corresponding to each fashion product, wherein the latent features data comprises design information, brand information, a type of fit, or combinations thereof of each of the fashion products.

16. A computer-implemented method for recommending size and fitting information for fashion products, the method comprising:

identifying a first plurality of fashion products and a second plurality of fashion products, the second plurality of fashion products (i) having a second type with greater similarity to a first type of the first plurality of fashion products than with a third type of a third set of fashion products (ii) purchased less frequently than any of the first fashion products by a set of users, wherein the first and second plurality of fashion products are previously purchased, and the greater similarity being based on a criterion being satisfied;

generating an observable user vector and a latent user vector for the first and second plurality of fashion products, wherein the observable user vector is generated based upon respective observable features data, and wherein the latent user vector is generated based upon respective latent features data;

training an autoencoder model configured to learn an initial compression, by densely representing the observable user vector and the latent user vector, and learn a subsequent decompression, wherein the compression causes a reduction, during the training, of a number of dimensions of each of the observable user vector and the latent user vector;

generating at least one size and fitting recommendation of the second plurality of fashion products based upon (i) the observable user vector, (ii) the trained model, and (iii) the latent user vector; and displaying, to the at least one user at a user interface, the at least one generated recommendation, comprising personalized size information across brands, fit type, brand type, product type, or combinations thereof of one or more of the second plurality of fashion products.

* * * * *